United States Patent
Kaitsu et al.

[11] Patent Number: 5,843,569
[45] Date of Patent: Dec. 1, 1998

[54] MAGNETIC RECORDING MEDIUM AND DEVICE

[75] Inventors: Isatake Kaitsu; Iwao Okamoto, both of Kawasaki, Japan

[73] Assignee: Fujitsu Limited, Kawasaki, Japan

[21] Appl. No.: 804,797

[22] Filed: Feb. 24, 1997

[30] Foreign Application Priority Data

Sep. 13, 1996 [JP] Japan .................................. 8-243397

[51] Int. Cl.⁶ .................................. G11B 5/66; B32B 5/16
[52] U.S. Cl. .................... 428/323; 428/323; 428/331; 428/336; 428/694 T; 428/694 TS; 428/694 ST; 428/900
[58] Field of Search .................... 428/694 T, 694 TS, 428/694 ST, 323, 331, 900, 328, 336

[56] References Cited

U.S. PATENT DOCUMENTS 5,494,722  2/1996  Oka ........................ 428/65.3
5,605,733  2/1997  Ishikawa ..................... 428/65.3

FOREIGN PATENT DOCUMENTS 59-42642  3/1984  Japan .
916934  1/1997  Japan .

*Primary Examiner*—Leszek Kiliman
*Attorney, Agent, or Firm*—Greer, Burns & Crain, Ltd.

[57] ABSTRACT

A magnetic recording medium comprising: a substrate; and a magnetic recording layer provided on the substrate, the magnetic recording layer being comprised of a thin film of a nonmagnetic material with crystal grains of $Co_{100-x}Pt_x$, wherein $10 \leq x < 20$, having an f.c.c. structure and an average grain diameter of not more than 50 nm being substantially uniformly dispersed therein, the product of the residual magnetization and the thickness of the magnetic recording layer being not more than 150 Gauss.μm.

8 Claims, 6 Drawing Sheets

↓ HEAT TREATMENT

↓

MAGNETIC RECORDING MEDIUM AND DEVICE

BACKGROUND OF THE INVENTION

1. Field of the Invention

The present invention relates to a magnetic recording medium which, in particular, has low noise level and high output, and a magnetic recording device using the same.

2. Description of the Related Art

For a magnetic recording device used as an external storage for an information processing device, an increase in amount of information has led to an ever-increasing demand for improved recording density. In the case of the conventional magnetic recording medium, however, increasing the recording density unfavorably results in lowered S/N value (lowered reproduction output and increased noise).

For this reason, the development of a magnetic recording medium having high reproduction output and low noise has been desired in the art. The generation of noise in the medium is attributable to the fluctuation of the transition region in the magnetization, which is in turn attributable to the magnetic interaction between ferromagnetic crystal grains constituting the ferromagnetic layer. Weakening the magnetic interaction between the ferromagnetic crystal grains is necessary for reducing the noise level of the medium. In the conventional magnetic recording medium, it is common practice to use a thin film prepared by sputtering a three-component or four-component alloy based on Co, and segregation of a ferromagnetic portion and a nonmagnetic portion from each other has been promoted by regulating the composition and preparation conditions of the thin film to reduce the noise level.

Japanese Unexamined Patent Publication (Kokai) No. 59-42642 discloses a prior art method in this field. The method comprises the steps of: providing glass or a heat-resistant polymeric film as a substrate; simultaneously using a magnetic metal and a nonmagnetic metal to form a finely mixed film at a low temperature; and heating the film to permit grains to grow, thereby preparing a film having desired magnetic properties. In this method, treatment only at a temperature of 400° C. or below is useful from the viewpoint of the heat resistance of the substrate, and treatment at a temperature above 400° C. has unfavorably resulted in lowered coercive force.

Further, according to Japanese Unexamined Patent Publication (Kokai) No. 59-42642, the thickness of the recording layer is mainly 130 to 150 nm, and it has been difficult to provide high coercive force in a thickness (not more than 30 nm) currently required of the magnetic recording medium.

For this reason, a magnetic recording medium has been proposed wherein a recording layer formed of Fe or an Fe-base alloy, or Co or a Co-base alloy, and a nonmagnetic material which does not dissolve these metals in solid solution, is formed and fine ferromagnetic particles are separated and precipitated in the nonmagnetic metal material to isolate the ferromagnetic particles constituting the magnetic recording medium from one another, thereby eliminating the magnetic interaction among these ferromagnetic particles to reduce the noise level of the medium in the high-density recording region (Japanese Unexamined Patent Publication (Kokai) No. 09-16934 published on Jan. 17, 1997).

For the magnetic recording medium disclosed in Japanese Unexamined Patent Publication (Kokai) No. 09-16934, i.e., a magnetic recording medium having a recording layer formed of Fe or an Fe-base alloy, or Co or a Co-base alloy, and a nonmagnetic material which does not dissolve these metals in solid solution, however, it has been difficult to provide a high coercive force of not less than 1500 Oe.

SUMMARY OF THE INVENTION

In order to solve the above problems, the present invention provides a magnetic recording medium comprising: a substrate; and a magnetic recording layer provided on the substrate, the magnetic recording layer being a thin film of a nonmagnetic material with crystal grains of $Co_{100-x}Pt_x$, wherein $10 \leq x < 20$, having an f.c.c. structure and an average grain diameter of not more than 50 nm being substantially uniformly dispersed therein, the product of the residual magnetization and the thickness of the magnetic recording layer being not more than 150 Gauss.$\mu$m.

Ferromagnetic particles are finely dispersed in a nonmagnetic material matrix to enhance the recording density and, at the same time, to reduce the noise level. According to the present invention, the average particle diameter of the ferromagnetic particles is not more than 50 nm, more preferably 10 to 20 nm, and a nonmagnetic material is interposed among the ferromagnetic particles to break off the magnetic interaction among the ferromagnetic particles.

Further, according to the present invention, the ferromagnetic particles comprise crystal grains of $Co_{100-x}Pt_x$, wherein $10 \leq x < 20$, having an f.c.c. structure which can realize high coercive force. It is possible to provide a coercive force of not less than 1200 Oe, preferably not less than 1500 Oe, more preferably not less than 1600 Oe. In the $Co_{100-x}Pt_x$, x should be $10 \leq x < 20$, preferably $11 \leq x < 17.5$, more preferably $12 \leq x < 16$, from the viewpoint of realizing the above high coercive force.

In order to use the magnetic recording medium in combination with a magnetoresistive magnetic head, the product (tBr) of the residual magnetization and the thickness of the magnetic recording layer should be not more than 150 Gauss.$\mu$m, preferably not more than 100 Gauss.$\mu$m.

Simultaneous use of CoPt and a nonmagnetic material noncompatible or sparingly compatible with CoPt to form a film having a single layer structure, or successive use of these materials to form a laminated film (preferably, nonmagnetic material/CoPt/nonmagnetic material), followed by post-annealing is preferred for the formation of a magnetic recording layer having the above granular structure.

Such nonmagnetic materials usable herein include silver (Ag), copper (Cu), carbon (C), and oxide ceramics ($Al_2O_3$, MgO). Among them, $SiO_2$ is preferred because an amorphous material is suitable as the matrix phase for the ferromagnetic particles.

Co and Pt also may be simultaneously used as an alloy or a composite target to form a film having a single layer structure, or alternatively Co and Pt may be successively used to form a laminated film. In this case, it should be noted that, after the deposition, the film should be annealed to uniformly and finely disperse Co and Pt in the nonmagnetic material and, at the same time, to bring them to crystal grains having an f.c.c. structure. Although CoPt is usually stable in the case of a h.c.p. structure, the f.c.c. structure is adopted in the present invention. The heat treatment temperature is preferably 400° C. or above, more preferably 500° to 600° C.

The volume ratio of the nonmagnetic material to the ferromagnetic CoPt in the magnetic recording layer is preferably 30:70 to 80:20, more preferably 50:50 to 70:30.

A thickness satisfying the above tBr value suffices for the magnetic recording layer. In general, however, the thickness is preferably not more than 30 nm, more preferably not more than 25 nm.

The substrate may be any nonmagnetic substrate. It, however, is preferably a nonmagnetic substrate of a material, which can withstand a temperature of 400° C. or above, such as Si, $SiO_2$, C, $Al_2O_3$, or MgO, from the viewpoint of withstanding the annealing. Preferred is an Si substrate the surface of which has been oxidized by a thickness of not less than 100 nm to form a surface oxide layer of $SiO_2$.

A suitable barrier layer may be provided between the substrate and the magnetic recording layer.

Further, a protective layer, a lubricating layer and the like may be provided on the magnetic recording layer. The protective layer may be formed of carbon (including graphite, diamond-like carbon, and diamond), $SiO_2$ or the like with carbon being preferred from the viewpoint of strength as a thin film.

The present invention can provide a magnetic recording medium free from magnetic interaction among the ferromagnetic particles and having a low noise level in a high recording density region, which magnetic recording medium is suitable for use in a high-density magnetic recording device.

DETAILED DESCRIPTION OF THE PREFERRED EMBODIMENTS

The present invention will be described in more detail with reference to the following embodiments.

Figure 1:
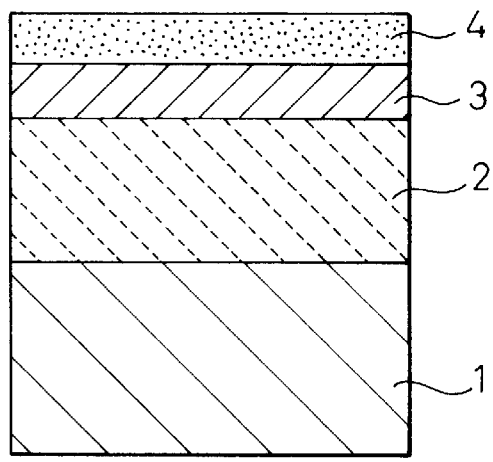
FIG. 1 is a schematic cross-sectional view of a conventional typical magnetic recording medium.

FIG. 1 is a schematic cross-sectional view of a conventional typical magnetic recording medium. The magnetic recording medium comprises a nonmagnetic substrate (Al/NiP) 1, a 100 nm-thick primer layer 2 of Cr provided on the substrate 1, a 20 nm-thick magnetic recording layer 3 of $CoCr_{12}Ta_2$ provided on the primer layer 2, and a 20 nm-thick protective film 4 of carbon provided on the recording layer 3. In this case, the product (tBr) of the thickness and the residual magnetization of the recording layer of $CoCr_{12}Ta_2$ is about 100 Gauss.μm.

Figure 2:
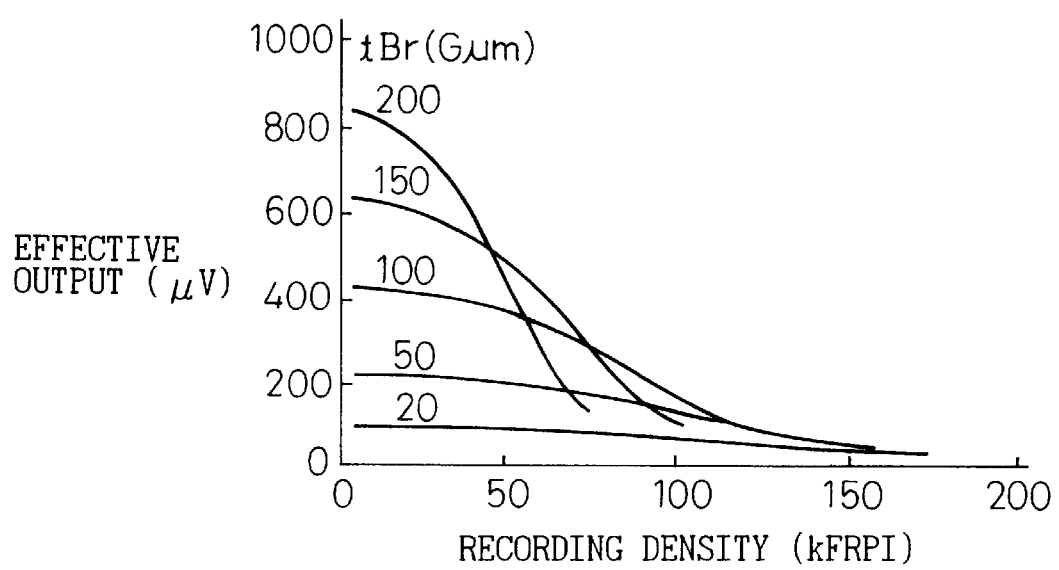
FIG. 2 is a diagram showing the relationship between the recording density and the reproduction output in an experiment using a magnetoresistive head.

In recent years, magnetoresistive heads (MR heads) have become used for reproduction of record signals with a high recording density. The MR heads have far higher sensitivity than conventional inductive heads. However, the linearity range of the sensitivity for the MR heads is narrower than that for the inductive heads. FIG. 2 shows the relationship between the recording density and the reproduction output in an experiment for five media different from one another in tBr using a magnetoresistive head. As is apparent from FIG. 2, in the low recording density region, media having a larger tBr value provide larger output. In the high recording density region, particularly as the recording density approaches 100 kFRPI, media having a lower tBr value provide larger reproduction output for the above reason. Therefore, a tBr of not more than 150 Gauss.μm is preferred for use of the magnetoresistive head in a high-density recording region.

Figure 3:
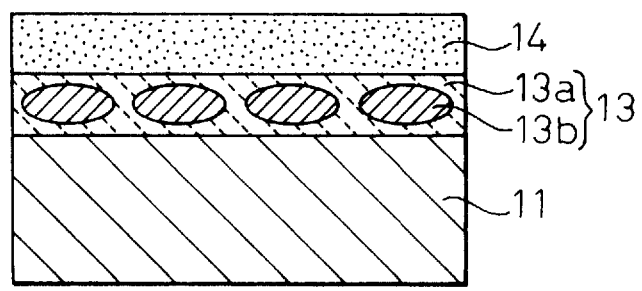
FIG. 3 is a schematic cross-sectional view of a magnetic recording medium according to an embodiment of a prior application.

FIG. 3 shows a schematic cross-sectional view of an embodiment of the magnetic recording medium disclosed in Japanese Patent Application No. 07-160437. According to this embodiment, a magnetic recording layer 13 has a granular structure comprising a magnetic material 13b dispersed in a particulate form in a nonmagnetic material 13a of $SiO_2$. The coercive force provided by this granular structure, even when combined with optimal heat treatment, is as low as about 1000 Oe.

Figure 4:
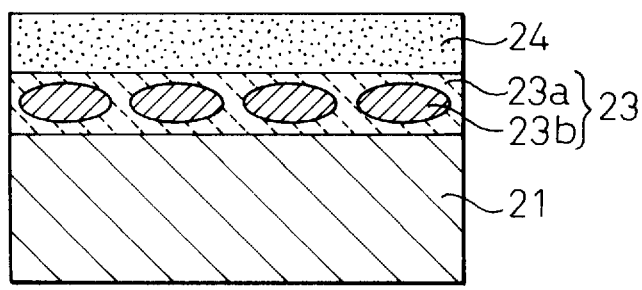
FIG. 4 is a cross-sectional view showing the structure of the magnetic recording medium according to a first embodiment of the present invention.

FIG. 4 is a schematic cross-sectional view of the magnetic recording medium according to a first embodiment of the present invention. A granular film 23 of $Co_{90}Pt_{10}/SiO_2$ is provided on an Si substrate 21, and a protective film 24 of carbon is provided on the granular film 23. The recording layer 23 comprises ferromagnetic $Co_{90}Pt_{10}$ crystal grains 23b dispersed in nonmagnetic $SiO_2$ (23a).

Figure 5A:
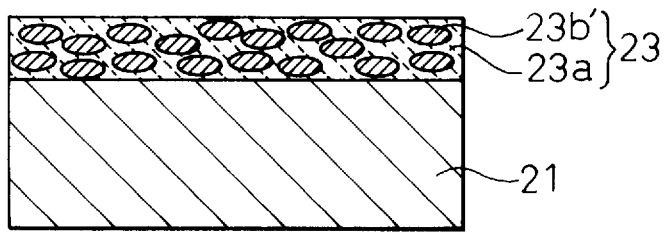
FIGS. 5A to 5C is a process diagram showing the steps of producing the magnetic recording medium according to the first embodiment of the present invention.
Figure 5B:
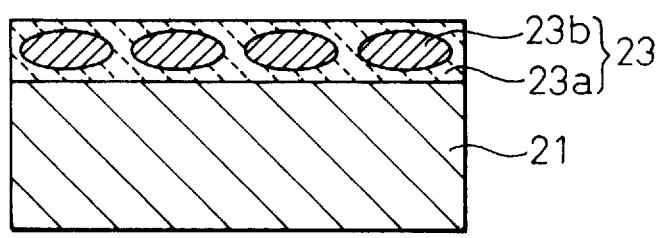
Figure 5C:
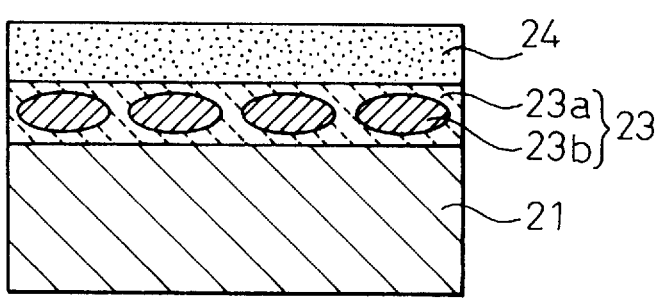

FIG. 5 shows a procedure for the preparation of the magnetic recording medium according to the first embodiment of the present invention. A 20 nm-thick $Co_{90}Pt_{10}$-$SiO_2$ film 23 is formed on a heat-resistant nonmagnetic substrate (Si) 21 by using a composite target (FIG. 5A, the film is annealed (600° C., one hr) under vacuum (not more than $5\times10^{-6}$ Torr) (FIG. 5B), and a 10 nm-thick protective film 24 of carbon is then formed on the surface of the film (FIG. 5C). The term "heat-resistant substrate" used herein refers to a substrate which can withstand a temperature of the heat treatment temperature to 400° C. or above, such as a substrate of Si, $SiO_2$, C, $Al_2O_3$, MgO or the like. Before the annealing, the coercive force is small because the CoPt crystal grains are small and, in some portion, are continuous from one another. Since CoPt and $SiO_2$ do not dissolve in each other in solid solution, the heat treatment accelerates the separation and precipitation of CoPt and $SiO_2$, permitting CoPt to be brought to a grain size of several tens of nm, which offers high coercive force. For achieving the high coercive force, the heat treatment should be performed at a temperature of 500° C. at the lowest. The reason why the thickness of the $Co_{90}Pt_{10}$-$SiO_2$ film in this embodiment is 20 nm is that this film thickness provides a tBr value of about 100 Gauss.μm. All the above films have been formed by sputtering. Sputtering conditions are tabulated in Table 1.

TABLE 1

| Film formed by sputtering | Sputtering conditions | | | | |
|---|---|---|---|---|---|
| | Ar Pressure | Substrate temp. | Sputtering power | DC bias voltage | |
| CoPt/SiO$_2$ | 5 mTorr | 20° C. | 0.2 kW | 0 V | |
| C | 10 mTorr | 20° C. | 1 kW | 0 V | |

[Note]
Substrate: Si (2.5 in.)
Sputtering: RF for CoPt—SiO$_2$, DC for carbon

Annealing conditions: about 500° C., 10 min

Figure 6:
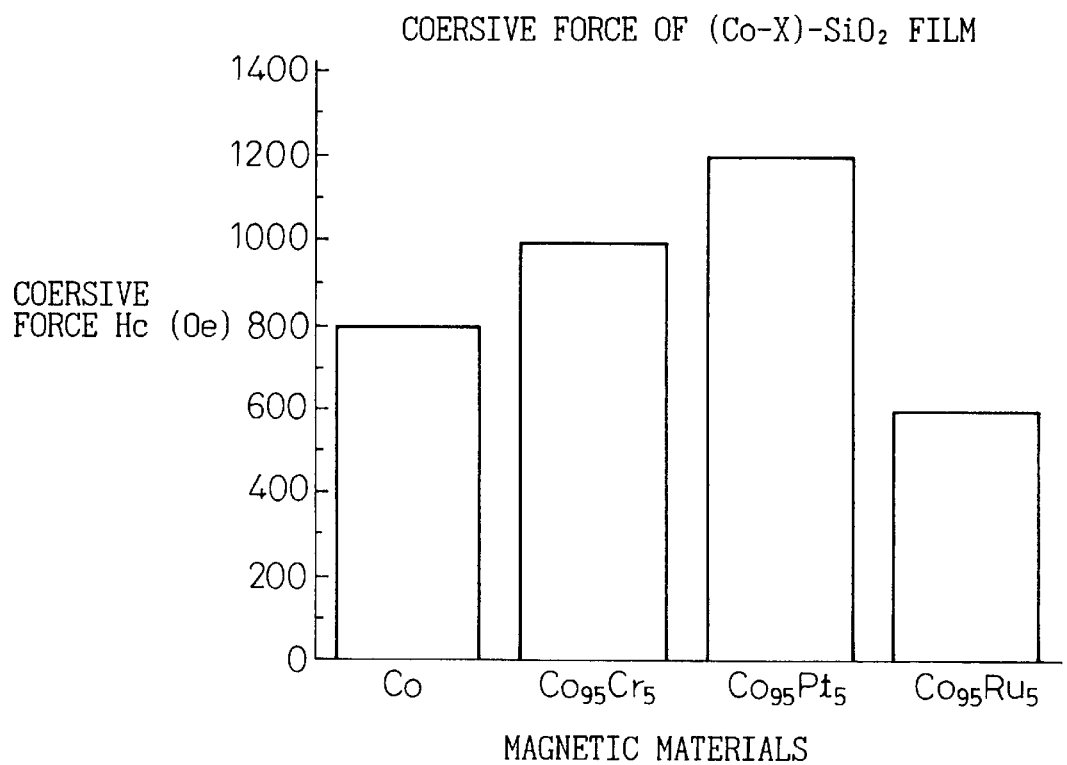
FIG. 6 is a diagram showing the coercive force of a medium comprising Co or a magnetic alloy material of Co, with a minor amount (5 at %) of a nonmagnetic metal added thereto, and $SiO_2$.

FIG. 6 is a diagram showing the coercive force of a medium comprising Co or a magnetic alloy material of Co, with a minor amount (5 at %) of a nonmagnetic metal added thereto, and SiO$_2$. The results shown in FIG. 6 are those for use, as the additive, of Cr, Pt, and Ru which stabilize the h.c.p. structure of Co. As is apparent from the drawing, the medium using a magnetic alloy material with Pt added thereto exhibits the highest coercive force. For this reason, the CoPt system was selected in the present invention.

Regarding the magnetic recording medium according to the second embodiment of the present invention, the film forming method is the same as that used in the first embodiment. In the second embodiment, however, Co$_{85}$Pt$_{15}$ was used as the magnetic material. The medium according to this embodiment has a coercive force of 1700 Oe.

Figure 7:
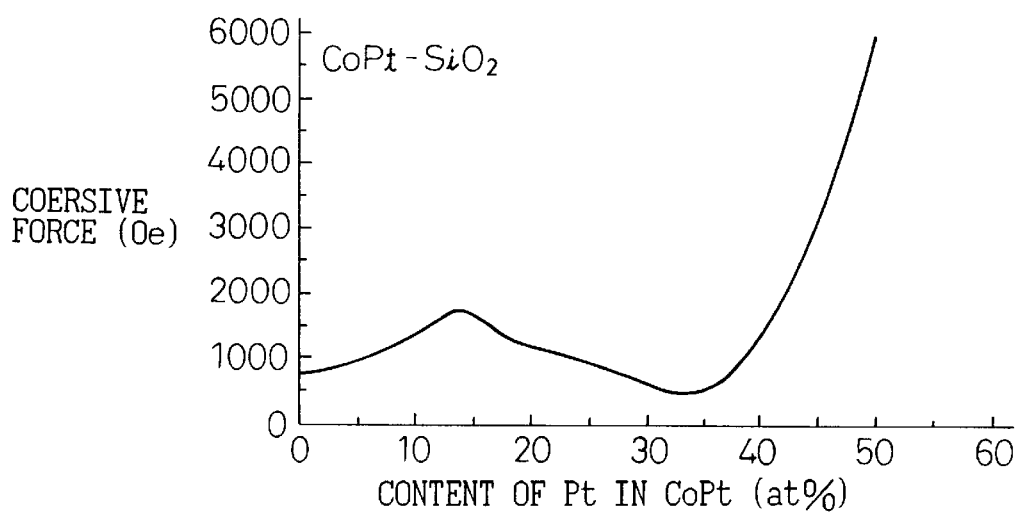
FIG. 7 is a diagram showing the dependency of the coercive force of a magnetic recording medium upon the amount of Pt added.

In the magnetic recording medium of the present invention, a change in coercive force with a change in composition ratio of Co to Pt in the ferromagnetic material is shown in FIG. 7. As is apparent form FIG. 7, as the amount of Pt added increases, the coercive force increases and, when the amount of Pt added is around 10 at % to a little less than 20 at %, reaches the maximum value, and again increases when the amount of Pt added is not less than 35 at %.

Further, the coercive force reaches not less than 1500 Oe at 11 to 27.5 at %; not less than 1600 Oe at 12 to 26 at %; and 1760 Oe at about 14 at %. It should be noted that the above is only one example and higher coercive force could be realized by optimization of the production conditions. The results of X-ray diffraction analysis show that, when the composition ratio of Pt exceeds 35 at %, the crystal system is of f.c.c. type, and observation under TEM reveals that the magnetic particles are in such a state they are not isolated from one another. From the above results, it can be said that a composition ratio of Pt to Co of 10 to less than 20 at % which provides a coercive force of 1200 Oe is suitable for use of the CoPt/SiO$_2$ film in the magnetic recording medium.

Figure 8:
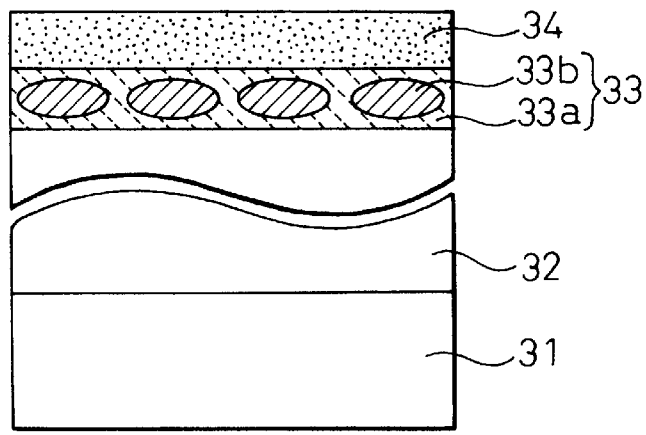
FIG. 8 is a cross-sectional view showing the structure of the magnetic recording medium according to a third embodiment of the present invention.

FIG. 8 is a schematic cross-sectional view showing the magnetic recording medium according to a third embodiment of the present invention. The film forming method and film forming conditions are as described above in connection with the first embodiment, except that an Si substrate (provided with a 300 nm-thick SiO$_2$ film 32) the surface of which has been oxidized is used as a substrate 31. The use of this substrate has the effect of preventing a deterioration in magnetic properties caused by the diffusion of Si from the substrate or the diffusion of the magnetic element (Co) from the recording layer during the heat treatment at a high temperature. Numeral 33 designates a recording layer of CoPt/SiO$_2$, and numeral 34 a protective layer of carbon.

For all the magnetic recording media according to the above embodiments, heat treatment is performed after the formation of the recording layer under high vacuum (not more than 5×10$^{-6}$ Torr). The heat treatment in a reducing atmosphere (a gas mixed with H$_2$) instead of that under high vacuum offers the same effect.

Figure 9:
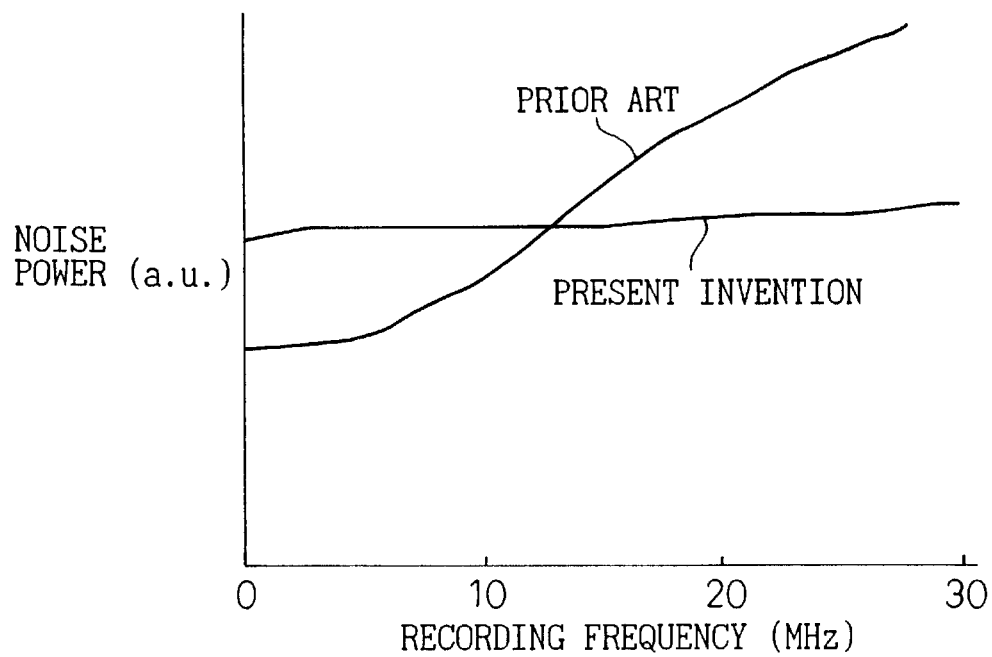
FIG. 9 is a diagram showing the dependency of the noise level of the magnetic recording medium according to the first embodiment of the present invention and the conventional medium upon the recording signal frequency.

FIG. 9 is a diagram showing the dependency of the noise level of the magnetic recording medium according to a third embodiment of the present invention and the conventional medium upon the recording signal frequency. An MR head was used as a reproducing head. In this case, the velocity (relative velocity of the head and the medium) was 10 m/sec, and the recording density at 20 MHz was 100 KFCI. From FIG. 9, it is apparent that, in the conventional medium, the noise level of the medium increases with increasing the recording frequency, whereas in the magnetic recording medium of the present invention, increasing the recording density brings about substantially no increase in the noise level of the medium.

Figure 10:
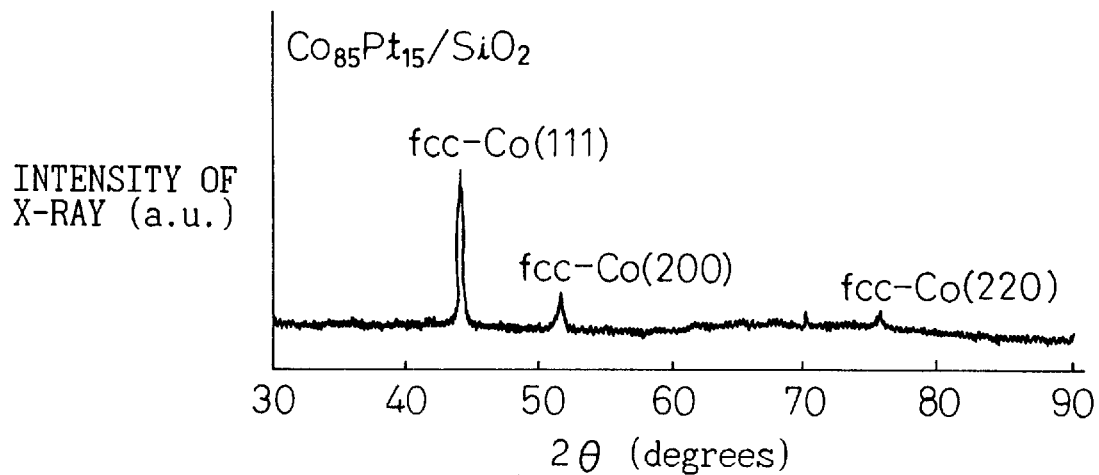
FIG. 10 is an X-ray diffraction pattern of the magnetic recording medium according to an embodiment of the present invention.

FIG. 10 is an X-ray diffraction pattern of the magnetic recording medium of the present invention. In general, it is said that a Co alloy having high coercive force is of h.c.p. structure. By contrast, for the magnetic recording medium of the present invention, a diffraction peak (200 face) inherent in an f.c.c. structure is observed, indicating that the CoPt alloy constituting the recording layer has the f.c.c. structure. The f.c.c. structure was confirmed for all the compositions (including x=10, x=15, and x=20) in Co$_x$Pt$_{1-x}$(10≦x<20).

Figure 11:
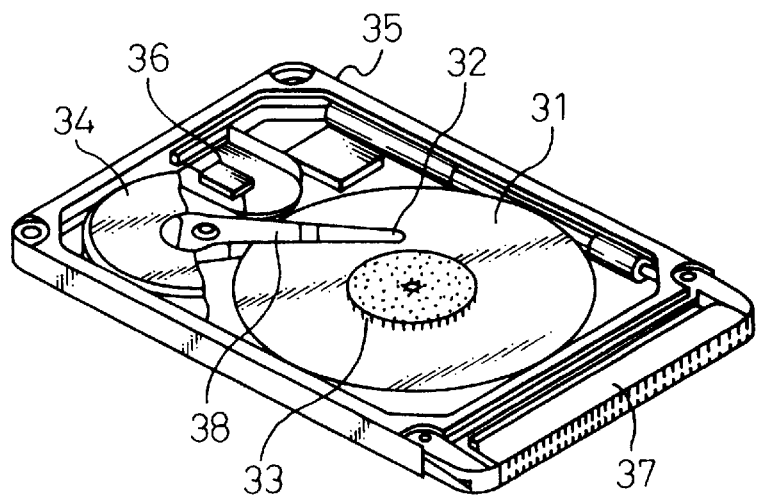
FIG. 11 is a diagram showing an embodiment of a magnetic recording device.

FIG. 11 shows an embodiment of a magnetic disk drive with a magnetic disk 21 as prepared above mounted thereon. A magnetoresistive magnetic head 22 is disposed so as to face the magnetic disk 21. In the drawing, numeral 23 designates a disk holder, numeral 24 a voice coil motor for driving a magnetic head, numeral 25 a housing, numeral 26 a semiconductor integral circuit device, numeral 27 a connector, and numeral 28 an arm, made of an elastic body, for supporting the magnetic head 22.

We claim:

1. A magnetic recording medium comprising: a substrate; and a magnetic recording layer provided on the substrate, the magnetic recording layer having crystal particles of Co$_{100-x}$Pt$_x$, wherein 10≦x<20, said crystal particle being substantially uniformly dispersed in a nonmagnetic material, said crystal particles having an f.c.c. structure and an average grain diameter of not more than 50 nm, wherein the product of the residual magnetization and the thickness of the magnetic recording layer is not more than 150 Gauss.μm.

2. The magnetic recording medium according to claim 1, wherein the nonmagnetic material is SiO$_2$.

3. The magnetic recording medium according to claim 1 or 2, wherein the substrate is a silicon substrate having a surface oxide film of SiO$_2$ having a thickness approximately equal to or greater than 100 nm.

4. The magnetic recording medium according to claim 1, 2 or 3 wherein the magnetic recording layer has a coercive force of not less than 1500 Oe.

5. A magnetic recording device comprising:
a magnetic recording medium including a substrate and a magnetic recording layer is provided on the substrate, the magnetic recording layer having crystal particles of Co$_{100-x}$Pt$_x$, wherein 10≦x<20, being substantially uniformly dispersed in a nonmagnetic material, said crystal particles having an f.c.c. structure and an average grain diameter of not more than 50 nm, wherein the product of the residual magnetization and the thickness of the magnetic recording layer being 150 Gauss.μm; and a magnetoresistive reproducing head.

6. The magnetic recording device according to claim 5, wherein the nonmagnetic material is $SiO_2$.

7. The magnetic recording device according to claim 5, wherein the substrate is a silicon substrate having a surface oxide film of $SiO_2$ with a thickness approximately equal to or greater than 100 nm.

8. The magnetic recording device according to claim 5, wherein the magnetic recording layer has a coercive force of not less than 1500 Oe.

* * * * *